Dec. 8, 1936.    A. NAGEL    2,063,330
PHOTOGRAPHIC ROLL FILM CAMERA
Filed Dec. 28, 1934

INVENTOR
August Nagel,
BY
ATTORNEY

Patented Dec. 8, 1936

2,063,330

UNITED STATES PATENT OFFICE 2,063,330

PHOTOGRAPHIC ROLL FILM CAMERA

August Nagel, Stuttgart-Nord, Germany, assignor, by mesne assignments, to Eastman Kodak Company, Jersey City, N. J., a corporation of New Jersey Application December 28, 1934, Serial No. 759,521
In Germany January 16, 1934

9 Claims. (Cl. 242—71)

This invention relates to photographic roll film cameras of the kind wherein the film, which may be of narrow width such for example as cinematograph film, is wound within the camera from a supply spool (sometimes arranged within a light-tight container) onto a take-up spool until all the exposures have been made, and the exposed film then rewound onto the supply spool.

With cameras of this type it is necessary to provide for rotation of the take-up spool in both directions, that is to say in one direction for winding the film from the supply spool onto the take-up spool and in the other direction for winding the film onto the supply spool from the take-up spool.

In a photographic roll film camera according to the present invention the take-up spool is permanently engaged at its ends by bearing members which are relatively fixed in the axial direction, and a clutch coupling is provided through which the take-up movement is normally transmitted from a winding key or knob to the take-up spool but which can be released to permit rotation of the take-up spool relatively to the winding key. Thus, the clutch coupling can be engaged when it is desired to wind the film from the supply spool onto the take-up spool but can be released after all the exposures have been made, so that the take-up spool is free to permit rewinding of the film onto the supply spool.

Figure 1:
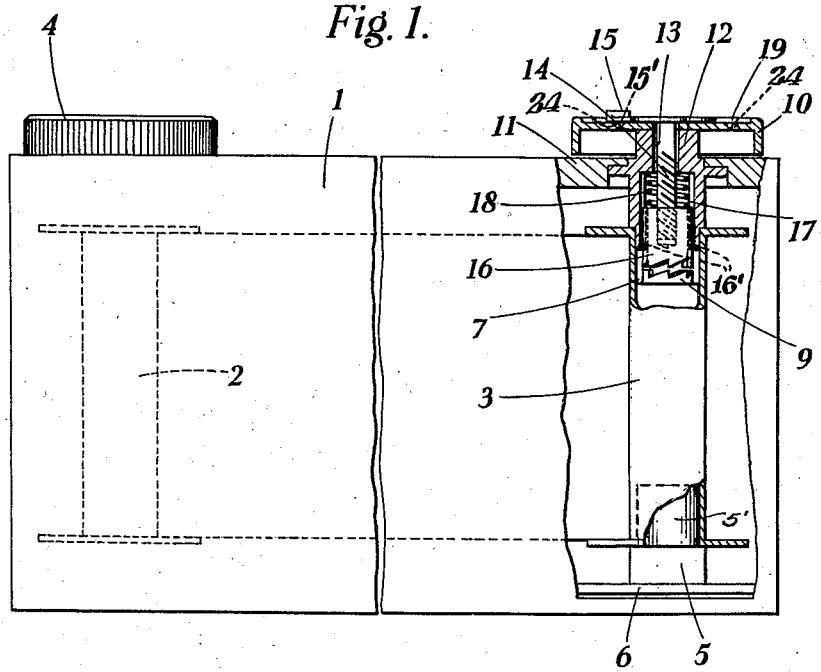
Figure 2:
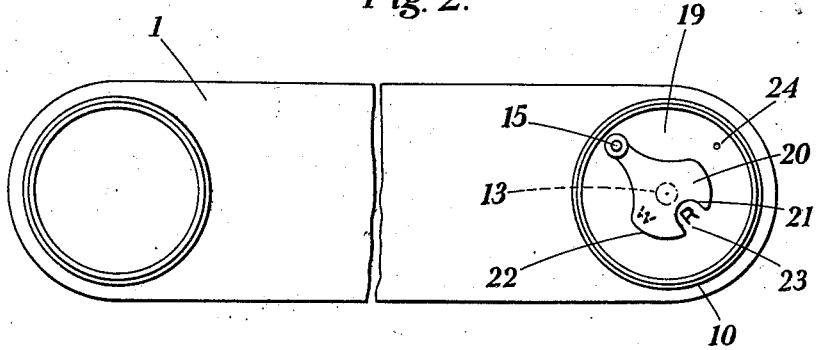

One construction of roll film camera embodying the present invention is illustrated somewhat diagrammatically and by way of example in the accompanying drawing, in which Figure 1 is a view partly in section, from the back of the camera, and Figure 2 is a plan of Figure 1.

In the construction illustrated the camera comprises a body or casing 1 containing a supply spool 2 and a take-up spool 3, the film F being wound from the supply spool 2 over the exposure frame of the camera to the take-up spool 3. A winding knob 4 is provided outside the camera for rotating the supply spool 2 when the film, after exposure, is to be rewound from the take-up spool 3 onto the supply spool 2.

The take-up spool 3 is permanently mounted to rotate within the camera, that is to say this spool is not detachable from the camera casing. One end of the take-up spool 3 engages a bearing 5 formed in or carried by a side wall 6 of the camera casing and having a restricted bearing portion 5', the core 7 of the spool being tubular and furnished with the usual longitudinal slot (not shown) for attachment of the end of the film F. Within the core 7 of the take-up spool is secured a ring or sleeve 9, one edge of which is furnished with ratchet teeth which serve as one member of a coupling through which the drive is transmitted, as hereinafter described, from a winding knob 10 outside the casing to the take-up spool 3.

Rotatable in an aperture in one wall 11 of the camera casing is a hollow spindle 12 to the outer end of which is secured the winding knob 10 whilst the inner end projects for a short distance into the take-up spool 3 and thus serves as one of the bearings for the take-up spool. Passing freely through the axial bore 13 in the spindle 12 is a screwthreaded control rod 14, to the outer end of which is secured a setting lever 15 (Figure 2) whilst the inner end of the rod 14 is in threaded engagement with a movable clutch member 16 having ratchet teeth arranged to cooperate with the fixed clutch member 9. The movable clutch member 16 is furnished with external grooves parallel to the length of the control rod 14, each of these grooves being engaged by a short projection 16' carried by the hollow spindle 12. The movable clutch member 16 can thus move axially within a chamber 17 formed within the spindle 12 but cannot rotate relatively to this spindle. A spring 18 tends to maintain the movable clutch member 16 in engagement with the fixed clutch member 9.

The outer surface of the winding knob 10 is recessed as shown at 19 and the setting lever 15 is furnished with an enlarged portion 20 cut away or notched at 21, the notch 21 cooperating with markings on the recessed surface 19 of the knob at 22 and 23 so as to indicate whether the clutch is in the closed or open position. The end of the setting lever 15 is furnished with a projection 15' directed towards the recessed face 19 of the knob 10 which is provided with two recesses, one of which is indicated at 24, these recesses being arranged to cooperate with the projection 15' on the setting lever 15 to retain this in each of the two set positions.

When a spool carrying a fresh unexposed film has been placed in the supply chamber of the camera and the film threaded onto the take-up spool 3, the setting lever 15 is set so that the notch 21 is in the position 22 so as to uncover the indication W. The clutch member 16 is now in engagement with the clutch member 9 and rotation of the winding knob 10 will wind the film onto the take-up spool 3. The spring 18 not only maintains the movable clutch 16 in engagement with the clutch member 9 but also retains the projection 15' on the lever 15 in engagement with the recess 24 on the winding knob 10.

When all the exposures have been made and it is therefore desired to rewind the film onto the supply spool 2, the setting lever 15 is moved to the position shown in Figure 2 that is to say so that the recess 21 is in the position 23 wherein it uncovers the indication R. The movement of the setting lever 15 into this position causes rotation of the control rod 14 to move the clutch member 16 away from the clutch member 9 against the action of the spring 18. The take-up spool 3 is thus uncoupled from the spindle 12 and can rotate freely on the inner end of this spindle thereby permitting the film to be rewound on the supply spool 2 by means of the knob 4.

With a view to preventing unintentional unwinding of the film from the spool 3, a brake device may be provided, say, within the winding knob 10.

It will be understood that the construction above described is given by way of example only and that details may be modified.

What I claim as my invention and desire to secure by Letters Patent is:—

1. In a photographic roll film camera, in combination, a casing, a take-up chamber within the casing, a take-up spool within the take-up chamber and provided with an axial opening, bearing members extending into said axial opening and permanently in engagement with the ends of the take-up spool, these bearing members being relatively fixed in the axial direction, a winding key associated with the take-up spool, and a clutch coupling through which the take-up movement is transmitted from the winding key to the take-up spool but which can be released to permit rotation of the take-up spool relatively to the winding key while the film is being unwound from said take-up.

2. In a photographic roll film camera, in combination, a casing, a take-up chamber within the casing, a take-up spool within the take-up chamber and provided with an axial opening, bearing members extending into said axial opening and permanently in engagement with the ends of the take-up spool, these bearing members being relatively fixed in the axial direction, a winding key associated with the take-up spool, a clutch coupling comprising a coupling member within the winding key and normally in engagement with the take-up spool so that the take-up movement is transmitted from the winding key through the coupling member to the take-up spool, and means whereby the coupling member can be moved out of engagement with the take-up spool so as to permit rotation of the spool relatively to the winding key while the film is being unwound from said take-up spool.

3. In a photographic roll film camera, in combination, a casing, a take-up chamber within the casing, a take-up spool within the take-up chamber, a winding key associated with the take-up spool and having a hollow spindle the inner end of which permanently engages the adjacent end of the take-up spool and constitutes a bearing therefor, a bearing member permanently in engagement with the other end of the take-up spool, the said bearings being relatively fixed in the axial direction, a clutch coupling comprising a coupling member longitudinally movable within the hollow spindle of the winding key and normally in engagement with the take-up spool so that the take-up movement is transmitted from the winding key through the coupling member to the take-up spool, and means whereby the coupling member can be moved out of engagement with the take-up spool so as to permit rotation of the take-up spool on the spindle of the winding key while the film is being unwound from said take-up spool.

4. In a photographic roll film camera, in combination, a casing, a take-up chamber within the casing, a take-up spool within the take-up chamber, a winding key associated with the take-up spool and having a hollow spindle the inner end of which permanently engages the adjacent end of the take-up spool and constitutes a bearing therefor, a bearing member permanently in engagement with the other end of the take-up spool, the said bearings being relatively fixed in the axial direction, a clutch coupling comprising a coupling member longitudinally movable within the hollow spindle of the winding key and normally in engagement with the take-up spool so that the take-up movement is transmitted from the winding key through the coupling member to the take-up spool, and a control rod passing axially through the winding key and connected at its inner end to the coupling member whilst its outer end is furnished with an operating member whereby the control rod can be actuated to move the coupling member out of engagement with the take-up spool thus permitting rotation of the take-up spool on the spindle of the winding key while the film is being unwound from said take-up spool.

5. In a photographic roll film camera, in combination, a casing, a take-up chamber within the casing, a take-up spool within the take-up chamber, a winding key associated with the take-up spool and having a hollow spindle the inner end of which permanently engages the adjacent end of the take-up spool and constitutes a bearing therefor, a bearing member permanently in engagement with the other end of the take-up spool, the said bearings being relatively fixed in the axial direction, a clutch coupling comprising a coupling member longitudinally movable within but not rotatable relatively to the hollow spindle of the winding key and normally in engagement with the take-up spool so that the take-up movement is transmitted from the winding key through the coupling member to the take-up spool, a control rod passing axially through the winding key and having its inner end in threaded engagement with the coupling member whilst its outer end is furnished with an operating member whereby the control rod can be rotated and the coupling member thus moved out of engagement with the take-up spool thus permitting rotation of the take-up spool on the spindle of the winding key while the film is being unwound from said take-up spool.

6. In a photographic roll film camera, in combination, a casing, a take-up chamber within the casing, a take-up spool within the take-up chamber, a winding key associated with the take-up spool and having a hollow spindle the inner end of which permanently engages the adjacent end of the take-up spool and constitutes a bearing therefor, a bearing member permanently in engagement with the other end of the take-up spool, the said bearings being relatively fixed in the axial direction, a clutch coupling comprising a coupling member longitudinally movable within the hollow spindle of the winding key, a spring tending to move and hold the coupling member in engagement with the take-up spool so that the take-up movement is transmitted from the winding key through the coupling member to the take-up spool, and means whereby the coupling member can be moved against the action of the spring out of engagement with the take-up spool so as to permit rotation of the take-up spool on the spindle of the winding key while the film is being unwound from said take-up spool.

7. In a photographic roll film camera, in combination, a casing, a take-up chamber within the casing, a take-up spool within the take-up chamber, a winding key associated with the take-up spool and having a hollow spindle the inner end of which permanently engages the adjacent end of the take-up spool and constitutes a bearing therefor, a bearing member permanently in engagement with the other end of the take-up spool, the said bearings being relatively fixed in the axial direction, a clutch coupling comprising a coupling member longitudinally movable within the hollow spindle of the winding key and normally in engagement with the take-up spool so that the take-up movement is transmitted from the winding key through the coupling member to the take-up spool, a control rod passing through the winding key and connected at its inner end to the coupling member, an operating member secured to the outer end of the control rod and lying outside the winding key, so that by movement of the operating member relatively to the winding key the control rod is actuated to move the coupling member out of engagement with the take-up spool thus permitting rotation of the take-up spool on the spindle of the winding key while the film is being unwound from said take-up spool, and latching means on the winding key which latching means cooperates with the operating member of the control rod to latch this in its set position.

8. In a photographic roll film camera, in combination, a casing, a take-up chamber within the casing, a take-up spool within the take-up chamber, a winding key associated with the take-up spool and having a hollow spindle the inner end of which permanently engages the adjacent end of the take-up spool and constitutes a bearing therefor, a bearing member permanently in engagement with the other end of the take-up spool, the said bearings being relatively fixed in the axial direction, a clutch coupling comprising a coupling member longitudinally movable within the hollow spindle of the winding key, a spring tending to move and hold the coupling member in engagement with the take-up spool so that the take-up movement is transmitted from the winding key through the coupling member to the take-up spool, an operating member lying outside the winding key and connected to the coupling member so that movement of the operating member in one direction relatively to the winding key will cause the coupling member to be moved, against the action of the spring, out of engagement with the take-up spool so as to permit rotation of the take-up spool on the spindle of the winding key while the film is being unwound from said take-up spool, and latching means on the winding key with which latching means the said operating member is held in engagement by the spring, thereby latching the operating member in its set position.

9. In a photographic roll film camera, in combination, a casing, a take-up chamber within the casing, a take-up spool within the take-up chamber, a winding key associated with the take-up spool and having a hollow spindle the inner end of which permanently engages the adjacent end of the take-up spool and constitutes a bearing therefor, a bearing member permanently in engagement with the other end of the take-up spool, the said bearings being relatively fixed in the axial direction, a clutch coupling comprising a coupling member longitudinally movable within but not rotatable relatively to the hollow spindle of the winding key, a spring tending to move and hold the coupling member in engagement with the take-up spool so that the take-up movement is transmitted from the winding key through the coupling member to the take-up spool, a control rod passing axially through the winding key and having its inner end in threaded engagement with the coupling member, an operating member carried by the outer end of the control rod and lying outside the winding key so that rotation of the operating member in one direction relatively to the winding key will cause the coupling member to be moved, against the action of the spring, out of engagement with the take-up spool so as to permit rotation of the take-up spool on the spindle of the winding key while the film is being unwound from said take-up spool, and latching means on the winding key with which latching means the said operating member is held in engagement by the spring thereby latching the operating member in its set position.

AUGUST NAGEL.